US009777798B2

(12) United States Patent
Klingston et al.

(10) Patent No.: US 9,777,798 B2
(45) Date of Patent: Oct. 3, 2017

(54) OFF-AXIS MOTOR WITH HYBRID TRANSMISSION METHOD AND SYSTEM

(71) Applicants: David E. Klingston, Shelby Township, MI (US); Travis J. Miller, Washington, IL (US); Goro Tamai, Bloomfield Hills, MI (US)

(72) Inventors: David E. Klingston, Shelby Township, MI (US); Travis J. Miller, Washington, IL (US); Goro Tamai, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 216 days.

(21) Appl. No.: 14/695,443

(22) Filed: Apr. 24, 2015

(65) Prior Publication Data
US 2015/0226289 A1    Aug. 13, 2015

Related U.S. Application Data

(63) Continuation-in-part of application No. 13/687,769, filed on Nov. 28, 2012, now abandoned.
(Continued)

(51) Int. Cl.
*F16H 3/08* (2006.01)
*F16H 3/00* (2006.01)
(Continued)

(52) U.S. Cl.
CPC ............. *F16H 3/006* (2013.01); *B60K 6/48* (2013.01); *B60L 7/12* (2013.01); *B60L 11/14* (2013.01); *B60L 15/20* (2013.01); *B60L 15/2009* (2013.01); *B60L 15/2054* (2013.01); *B60K 2006/4808* (2013.01); *B60K 2006/541* (2013.01); *B60L 2240/12* (2013.01);
(Continued)

(58) Field of Classification Search
CPC ....................... F16H 37/021; F16H 2003/0931
USPC .................................. 74/330, 331, 333, 340
See application file for complete search history.

(56) References Cited

U.S. PATENT DOCUMENTS 6,332,257 B1    12/2001    Reed, Jr. et al.
7,347,116 B2 *    3/2008    Sakamoto ................ B60K 6/36
                                                                                 74/329

(Continued)

FOREIGN PATENT DOCUMENTS

DE    102010010436 A1    9/2011
EP       2390127 A1    11/2011
(Continued)

OTHER PUBLICATIONS

Written Opinion and International Search Report dated Feb. 27, 2013 for International Application No. PCT/US2012/068977, International Filing Date Dec. 11, 2012.

*Primary Examiner* — Ha D Ho
(74) *Attorney, Agent, or Firm* — Ralph E. Smith

(57) ABSTRACT

A system and method for modifying a transmission in a gasoline-electric hybrid vehicle to couple the transmission to an off-axis electric motor. The transmission includes a motor-driven gear that replaces or modifies an engine-driven reverse gear. The motor-driven gear is hard-splined to an output shaft of the transmission. An electric motor is coupled to the output shaft of the transmission via the motor-driven gear. The electric motor may thus be oriented along an axis that differs from the axis of the transmission's output shaft.

20 Claims, 5 Drawing Sheets

Related U.S. Application Data

(60) Provisional application No. 61/577,155, filed on Dec. 19, 2011.

(51) Int. Cl.
- *B60K 6/48* (2007.10)
- *B60L 7/12* (2006.01)
- *B60L 11/14* (2006.01)
- *B60L 15/20* (2006.01)
- B60K 6/54 (2007.10)
- F16H 3/093 (2006.01)

(52) U.S. Cl.
CPC ... *B60L 2240/421* (2013.01); *B60L 2240/423* (2013.01); *B60L 2240/441* (2013.01); *B60L 2240/486* (2013.01); *B60Y 2304/076* (2013.01); *F16H 2003/008* (2013.01); *F16H 2003/0931* (2013.01); *Y02T 10/626* (2013.01); *Y02T 10/6221* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/902* (2013.01); *Y10T 29/49464* (2015.01); *Y10T 74/19014* (2015.01)

(56) References Cited

U.S. PATENT DOCUMENTS

| | | | |
|---|---|---|---|
| 7,363,996 B2 | 4/2008 | Kamada et al. | |
| 8,480,524 B2* | 7/2013 | Kunze | B60K 6/48 475/5 |
| 8,608,615 B2 | 12/2013 | Fuechtner | |
| 8,684,873 B2 | 4/2014 | Schrage | |
| 8,771,135 B2* | 7/2014 | Tanba | B60K 6/36 477/5 |
| 8,931,371 B2 | 1/2015 | Xie et al. | |
| 9,625,006 B2* | 4/2017 | Mohlin | F16H 3/62 |
| 2003/0069103 A1 | 4/2003 | Ibamoto et al. | |
| 2005/0072609 A1* | 4/2005 | Eisenhardt | B60K 1/02 180/65.235 |
| 2008/0000312 A1 | 1/2008 | Lang et al. | |
| 2009/0105042 A1 | 4/2009 | Tanba | |
| 2011/0290072 A1 | 12/2011 | Xie et al. | |

FOREIGN PATENT DOCUMENTS

| | | |
|---|---|---|
| FR | 2689821 A1 | 10/1993 |
| FR | 2772675 A1 | 6/1999 |

* cited by examiner

OFF-AXIS MOTOR WITH HYBRID TRANSMISSION METHOD AND SYSTEM

CROSS-REFERENCE TO RELATED APPLICATIONS

This application claims priority to U.S. Non-Provisional application Ser. No. 13/687,769, filed Nov. 28, 2012 and U.S. Provisional Ser. No. 61/577,155, filed Dec. 19, 2011.

FIELD

The technology herein relates generally to changing a conventional transmission into a hybrid transmission. More particularly, the technology herein relates to coupling an off-axis electric motor to a transmission.

BACKGROUND

A gasoline-electric hybrid vehicle includes both a gasoline-powered engine and an electric-powered motor. In a parallel hybrid system, the gasoline-powered engine and the electric-powered motor are both coupled to the vehicle's transmission. The resultant hybrid transmission converts the gasoline-powered engine and electric-powered motor output torques to an output torque sufficient to power the vehicle's drive shaft.

Traditionally, as illustrated in FIG. 1, electric-powered motors 130 in a hybrid vehicle 100 have been provided along the same axis as the output shaft 120 of the vehicle's transmission 110. While on-axis positioning may result in certain efficiencies in the transmission of power from the electric motor to the transmission to the vehicle's drive shaft, the size and related output ability of an on-axis electric motor is often constrained by positions of already existing engine components. Thus, the on-axis electric motor is often less powerful than desired, necessitating the inclusion of a second auxiliary electric motor that is used to make up for the shortcomings of the primary electric motor.

Thus, there is a need and a desire to simplify gasoline-electric hybrid vehicles by using an electric-powered motor that provides sufficient power so that the vehicle need only rely upon one electric-powered motor. There is also a need and a desire to be able to convert a traditional transmission in an engine compartment to a hybrid transmission that can couple to an electric-powered motor of sufficient power.

SUMMARY

In one aspect, the present disclosure provides a transmission coupled to an off-axis electric motor in a gasoline-electric hybrid vehicle. The transmission includes a motor-driven gear that replaces an engine-driven reverse gear. The motor-driven gear is hard-splined to an output shaft of the transmission. An electric motor is coupled to the output shaft of the transmission via the motor-driven gear. Thus, the electric motor may be oriented along an axis that differs from the axis of the transmission's output shaft. A motor drive unit couples the electric motor to the motor-driven gear and provides for both forward and reverse torque. The motor-driven gear and motor drive unit are configured so that the electric motor provides a torque ratio that varies from 5:1 to 8:1.

In another aspect, the present disclosure provides a method of modifying a transmission in a gasoline-electric hybrid vehicle in order to couple the transmission to an off-axis electric motor. The method includes replacing or modifying an engine-driven reverse gear of the transmission with or to be a motor-driven gear. A motor drive unit is coupled to the motor-driven gear to provide both forward and reverse torque to an output shaft of the transmission. The method further includes coupling an off-axis electric motor to the transmission output shaft via the motor drive unit and the motor-driven gear. The off-axis electric motor is oriented along an axis that differs from the axis of the transmission's output shaft. The motor-driven gear and motor drive unit are configured so that the electric motor provides a torque ratio that varies from 5:1 to 8:1.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

In order to provide a gasoline-electric hybrid vehicle with a single electric motor that provides sufficient power so that the vehicle need not rely upon a second electric motor, either the vehicle's existing engine/engine compartment must be reconfigured to allow a sufficiently powerful on-axis electric motor or a sufficiently powerful electric motor must be located in a non-traditional position within the engine compartment. Because redesigning the vehicle's engine/engine compartment is costly and time-consuming, the more efficient option is to modify existing engine structures to include an electric motor that is positioned on a different axis than the vehicle's transmission output shaft. An off-axis electric motor can both provide sufficient power to the hybrid vehicle and can do so by minimizing necessary changes to other engine compartment components such as the gasoline engine. By coupling the off-axis motor to the output shaft of the vehicle using gears, for example, that can step-up the off-axis motor's output torque, the off-axis motor can still maintain a small form factor.

Figure 1:
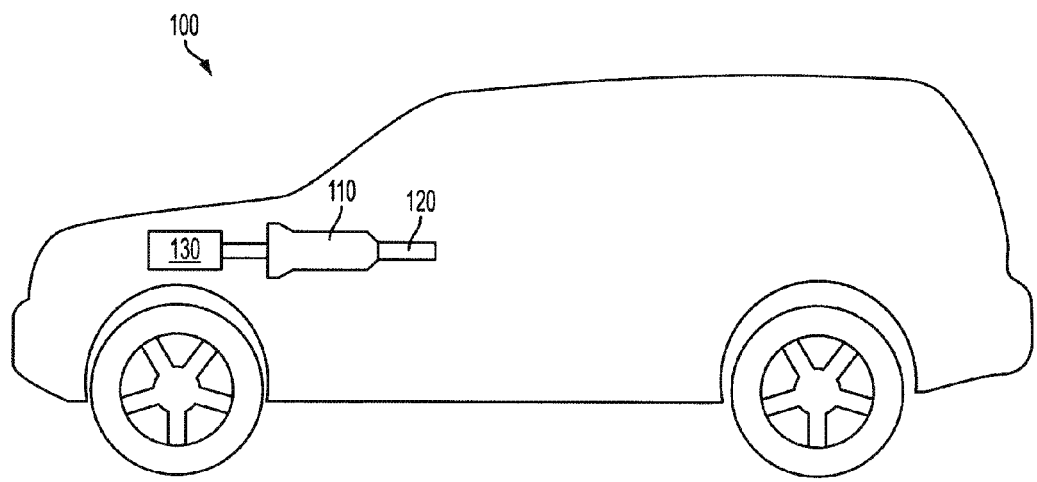
FIG. 1 illustrates an on-axis electric-powered motor in a gasoline-electric hybrid vehicle.
Figure 2:
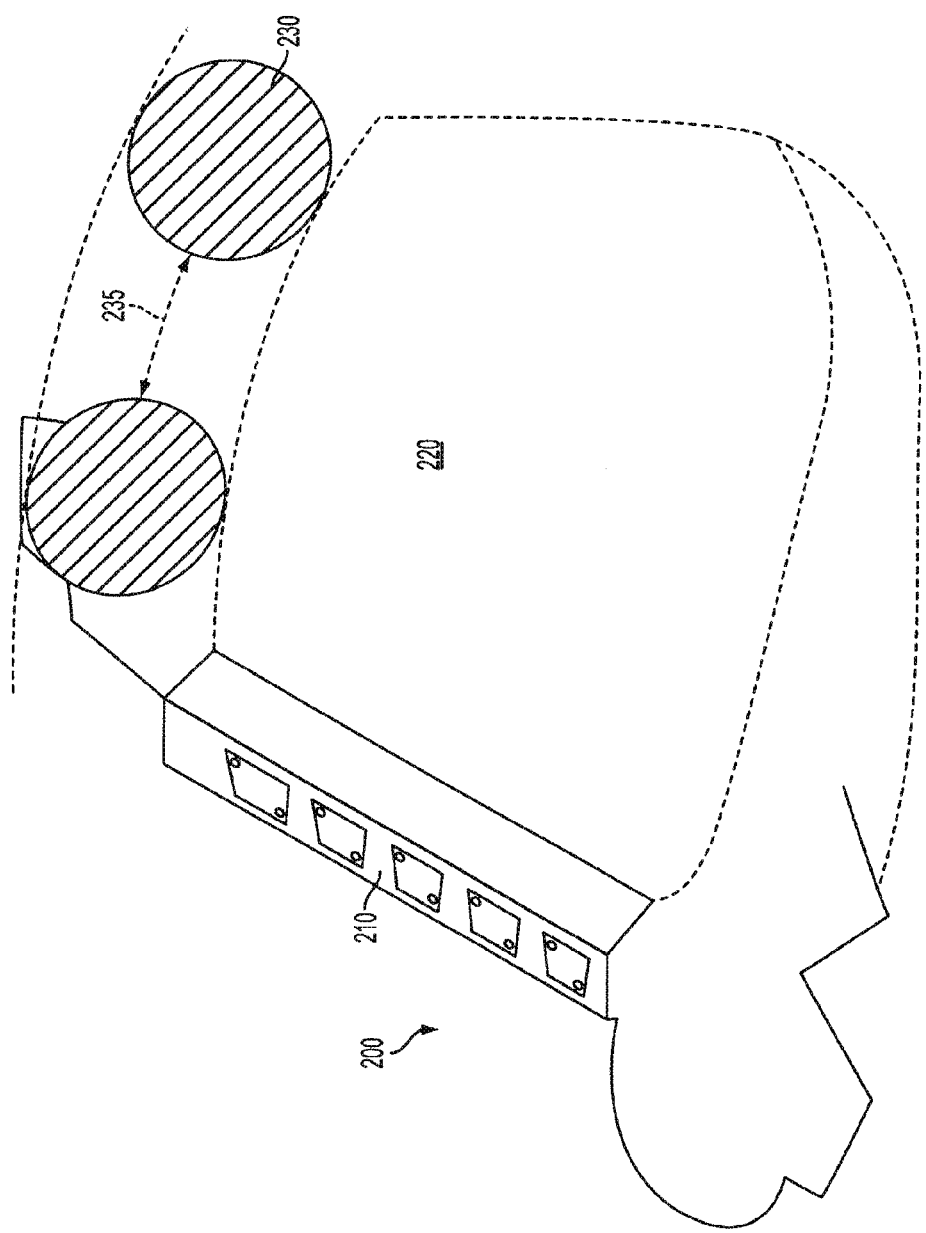
FIG. 2 illustrates an off-axis electric-powered motor in a gasoline-electric hybrid vehicle according to the principles of the present disclosure.

FIG. 2 illustrates a profile of a portion of a vehicle's engine compartment 200. Within the compartment 200, a gasoline-powered engine 210 and a transmission 220 are included. The gasoline-powered engine 210 is coupled to the transmission 220 to provide torque output to the transmission 220 (and ultimately to the vehicle's drive shaft). In addition, FIG. 2 includes an off-axis electric motor 230. The off-axis electric motor 230 is positioned so that it is not constrained by on-axis obstacles. Instead, the off-axis electric motor 230 is positioned anywhere within an arc bubble 235. The off-axis motor's exact placement within the arc bubble 235 is dependent on the specific engine compartment 200 and the position that results in the most efficient relay of power to the transmission 220. Specifically, the off-axis electric motor 230 is positioned within the arc bubble 235 such that the motor 230 may be implemented with a length/diameter ratio that provides a desired motor efficiency when the off-axis motor 230 is coupled to the transmission using appropriate gearing, for example.

The off-axis motor 230 is coupled to the transmission 220. The transmission 220 is modified to allow the off-axis motor 230 to couple to the transmission's output through an off-axis lay shaft, as is illustrated in FIGS. 3 and 4.

Figure 3:
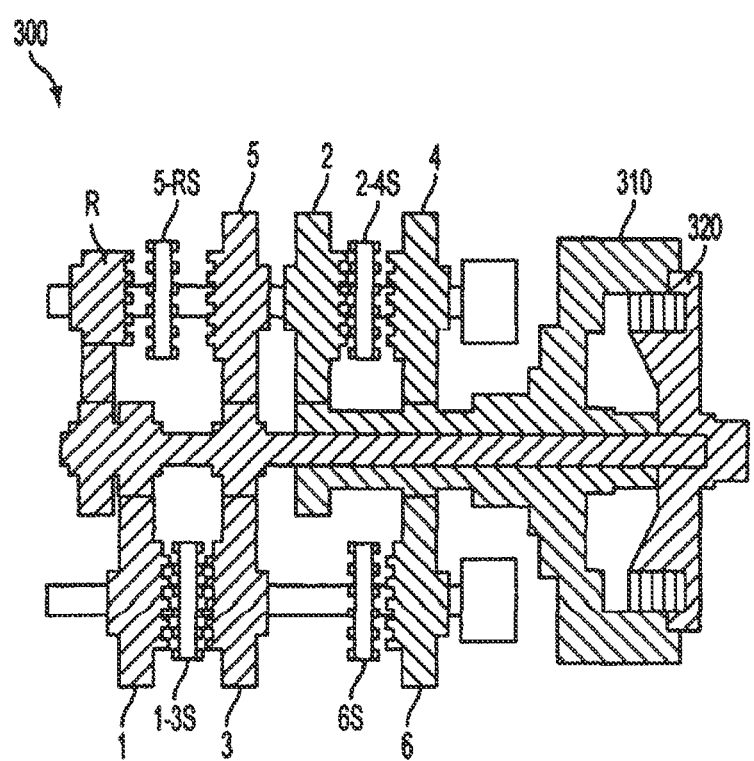
FIG. 3 illustrates a conventional dry dual-clutch transmission.

FIG. 3 illustrates a conventional dry dual-clutch transmission ("DDCT") 300 that can be modified for coupling with the off-axis electric motor 230. While any type of transmission may be modified using the techniques described herein, the steps required to modify the DDCT 300 are typical of the steps used to modify other transmissions.

The DDCT 300 illustrated in FIG. 3 incldes six forward-direction gears and one reverse-direction gear. One clutch 310 is coupled to the even-numbered gears 2, 4 and 6, while a second clutch 320 is coupled to the odd-numbered gears 1, 3 and 5. The second clutch 320 is also coupled to the reverse gear R, such as with a reverse idler gear as shown in FIG. 3. The gears are coupled to the transmission output shaft via synchronizers that act to match the speed of the gear to that of the shaft as each gear is engaged. The synchronizers are often shared between gears. In DDCT 300, a synchronizer 5-RS is shared between the transmission's 5th gear and the transmission's reverse gear. A synchronizer 1-3S is shared between the first and third gears. A synchronizer 2-4S is shared between the second and fourth gears. The sixth gear has its own synchronizer 6S.

Figure 4:
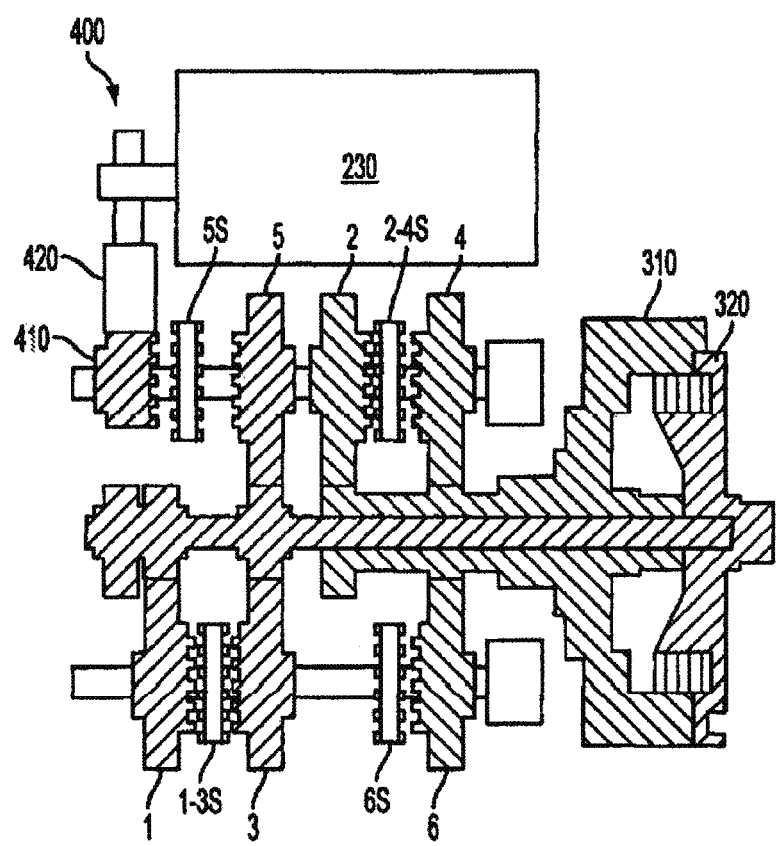
FIG. 4 illustrates a modified dry dual-clutch transmission and an off-axis electric motor according to the principles of the present disclosure.

The DDCT 300 of FIG. 3 is modified in FIG. 4 to allow for the coupling of the off-axis electric motor 230. FIG. 4 illustrates a modified DDCT 400 with the off-axis motor 230. The modified DDCT 400 still includes gears 1-6 and synchronizers 1-3S, 2-4S and 6S. However, the reverse gear R and the synchronizer 5-RS have been modified. In order to couple the motor 230 to the transmission output shaft, the reverse gear R is modified or replaced with a motor-driven gear 410. The motor-driven gear 410 is coupled to the motor 230 via a motor drive unit 420 that may include an idler gear or chain sprockets. The motor-driven gear 410 or modified reverse gear is hard-splined to the transmission output shaft, thus eliminating a need for the gear to couple via a synchronizer. Thus, the synchronizer 5-RS is or may be modified to act as a synchronizer to the fifth gear only and not the motor driven gear 410, thus becoming synchronizer 5S. In this regard, the motor driven or modified reverse gear 410 may optionally not include synchronizer coupling teeth and the synchronizer 5S may optionally not include corresponding synchronizer coupling teeth on a side facing gear 410.

The motor drive unit 420 couples the electric motor 230 to the motor-driven gear 410 and is able to provide both forward and reverse torque and direction. Thus, the modified DDCT 400 provides an electric-only reverse mode. Forward modes are provided by either the electric motor 230 or the gasoline-powered engine 210. The electric motor 230 has sufficient output to either fully propel the vehicle or to provide torque assist to the gasoline-powered engine 210. In addition, the electric motor 230 is capable of generating electric power via, for example, regenerative braking.

The off-axis motor 230 may be coupled to transmissions other than the DDCT 300. In each case, the transmission's reverse gear is modified to be or replaced with a motor-driven gear. The modified reverse gear or motor-driven gear is hard-splined to the transmission's output shaft and is coupled to the off-axis motor 230 via a motor drive unit. If the transmission's original reverse gear had shared a synchronizer with another gear, then the shared synchronizer is replaced with a synchronizer specific to the gear that had shared the synchronizer with the reverse gear.

In each modified transmission, the reverse gear is modified to be or replaced with a motor-driven gear that is sized to provide an approximately 5:1 torque ratio from the off-axis motor 230. The torque ratio may vary, but is generally a ratio between 5:1 and 8:1. If needed, an idler gear and/or chain sprocket may be used to couple the off-axis motor 230 to the motor-driven gear to achieve the desired torque ratio, as dictated by the size of the off-axis motor 230. In this way, the off-axis motor 230 may be maintained as a small motor with conventional length/diameter aspect ratios that can still provide sufficient output torque.

While an object of the present disclosure is to enable placement of a single electric motor of sufficient power to avoid use of additional electric motors, nothing in this disclosure prevents the use of additional electric motors that may be coupled to the gas-powered engine in order to restart the gas-powered engine or even to provide additional electric power generation.

Figure 5:
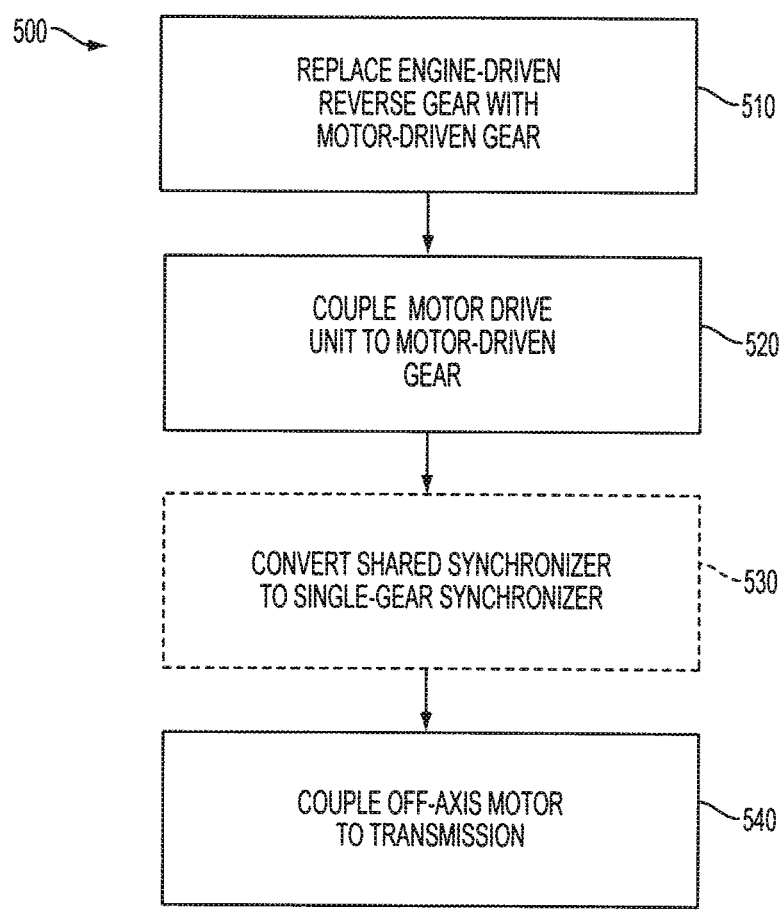
FIG. 5 illustrates an exemplary method of modifying a transmission to couple with an off-axis electric motor according to the principles of the present disclosure.

A method 500 of modifying a transmission to couple with an off-axis electric motor is illustrated in FIG. 5. At step 510, the transmission's reverse gear is modified to be or replaced with a motor-driven gear. The motor-driven is hard-splined to the transmission's output shaft. At step 520, a motor drive unit is coupled to the motor-driven gear to provide both forward and reverse torque and direction to the gear. At step 530, if necessary, any synchronizer previously shared between the transmission's reverse gear and an additional gear is or may be replaced or modified by a synchronizer specific to the additional gear only. Steps 510, 520 and 530 may be performed in any order. At step 540, an off-axis electric motor is coupled to the transmission via the motor drive unit and the motor-driven gear.

What is claimed is:

1. A dual clutch transmission coupled to an off-axis electric motor in a gasoline-electric hybrid vehicle, comprising:

a motor-driven modified reverse gear that replaces an engine-driven reverse gear, the motor-driven modified reverse gear being hard-splined to an output shaft of the transmission in a same position as the engine-driven reverse gear; and an off-axis electric motor coupled to the output shaft of the transmission via the motor-driven modified reverse gear, the electric motor including an electric motor driven gear directly coupled to the motor-driven modified reverse gear;

wherein the electric motor is configured to provide forward and reverse torque and an electric only reverse mode via its coupling to the motor-driven modified reverse gear.

2. The transmission of claim 1, wherein the motor-driven modified reverse gear is positioned at a first end of the output shaft opposed to a second end of the output shaft adjacent dual clutches of the dual clutch transmission.

3. The transmission of claim 2, further comprising a modified synchronizer that replaces a reverse and forward direction gear synchronizer positioned between the motor-driven modified reverse gear and forward direction gear, the modified synchronizer configured to synchronize with only the forward direction gear.

4. The transmission of claim 1, further comprising an idler gear that couples the electric motor to the motor-driven modified reverse gear.

5. The transmission of claim 1, further comprising chain sprockets that couple the electric motor to the motor-driven modified reverse gear.

6. The transmission of claim 1, wherein the motor-driven modified reverse gear is configured to rotate the output shaft in both forward and backward directions.

7. The transmission of claim 1, wherein the electric motor is coupled to the output shaft along an axis that differs from an axis defined by the output shaft.

8. The transmission of claim 1, wherein the electric motor is configured to both provide and generate electric power.

9. The transmission of claim 1, wherein only one electric motor is coupled to the transmission.

10. The transmission of claim 1, wherein the transmission is a dry dual-clutch transmission.

11. The transmission of claim 1, wherein the motor-driven modified reverse gear is sized to provide a torque ratio from the electric motor of between 5:1 and 8:1.

12. The transmission of claim 9, wherein the motor-driven modified reverse gear is sized to provide a torque ratio from the electric motor of 5:1.

13. A method of modifying a dual clutch transmission in a gasoline-electric hybrid vehicle to couple the transmission to an off-axis electric motor, the method comprising:
    replacing an engine-driven reverse gear of the transmission with a motor-driven reverse gear, the motor-driven reverse gear being non-rotatably fixed to an output shaft of the transmission in a same position as the engine-driven reverse gear;
    coupling an electric motor drive unit directly to the motor-driven reverse gear to provide both forward and reverse torque to the output shaft of the transmission; and
    coupling an off-axis electric motor to the transmission output shaft via the motor drive unit and the motor-driven reverse gear, the electric motor and drive unit configured to provide an electric-only reverse mode.

14. The method of claim 13, wherein the motor-driven reverse gear being non-rotatably fixed to an output shaft of the transmission further comprises hard-splining the motor-driven gear to the transmission's output shaft.

15. The method of claim 13, further comprising using an idler gear in the motor drive unit to couple the off-axis electric motor to the motor-driven gear.

16. The method of claim 13, further comprising using chain sprockets in the motor drive unit to couple the off-axis electric motor to the motor-driven gear.

17. The method of claim 13, wherein coupling the off-axis electric motor to the transmission output shaft comprises coupling the off-axis electric motor to the transmission output shaft along an axis that differs from an axis defined by the output shaft.

18. The method of claim 13, further comprising using the off-axis electric motor to provide electric power and to generate electric power.

19. The method of claim 13, wherein only one off-axis electric motor is coupled to the transmission.

20. The method of claim 13, wherein replacing an engine-driven reverse gear of the transmission with a motor-driven reverse gear comprises using a motor-driven reverse gear sized to provide a torque ratio from the off-axis electric motor of between 5:1 and 8:1.

* * * * *